(12) United States Patent
Narang et al.

(10) Patent No.: US 8,428,637 B2
(45) Date of Patent: Apr. 23, 2013

(54) EXTENDING ACCESS TERMINAL BATTERY LIFE THROUGH SEARCH RATE CONTROL

(75) Inventors: Mohit Narang, Escondido, CA (US); Christopher Brunner, San Diego, CA (US); Srinivasan Vasudevan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 949 days.

(21) Appl. No.: 12/170,365

(22) Filed: Jul. 9, 2008

(65) Prior Publication Data
US 2009/0209278 A1    Aug. 20, 2009

Related U.S. Application Data

(60) Provisional application No. 60/948,935, filed on Jul. 10, 2007.

(51) Int. Cl.
*H04B 17/00* (2006.01)
*H04B 1/00* (2006.01)
*H04B 1/04* (2006.01)
*H04B 7/00* (2006.01)

(52) U.S. Cl.
USPC ....... 455/522; 455/69; 455/127.1; 455/67.11; 455/553.1

(58) Field of Classification Search ........... 455/550.1, 455/552.1, 553.1, 67.13, 464, 452.1, 446, 455/453, 443, 444
See application file for complete search history.

(56) References Cited

U.S. PATENT DOCUMENTS

| | | | |
|---|---|---|---|
| 6,246,673 B1 * | 6/2001 | Tiedemann et al. | 370/333 |
| 6,690,659 B1 * | 2/2004 | Ahmed et al. | 370/328 |
| 6,704,581 B1 * | 3/2004 | Park et al. | 455/553.1 |
| 6,907,257 B1 * | 6/2005 | Mizutani et al. | 455/464 |
| 6,985,727 B2 * | 1/2006 | Janardhanan | 455/434 |
| 7,085,569 B2 * | 8/2006 | Ohmori | 455/435.2 |
| 7,409,214 B2 * | 8/2008 | Lee | 455/436 |
| 7,590,078 B2 * | 9/2009 | Nanda | 370/310 |
| 7,630,343 B2 * | 12/2009 | Zhu et al. | 370/334 |
| 7,657,283 B2 * | 2/2010 | Cai | 455/552.1 |
| 7,668,548 B2 * | 2/2010 | Choi | 455/437 |
| 7,853,215 B2 * | 12/2010 | Kurek et al. | 455/67.11 |
| 8,064,405 B2 * | 11/2011 | Parekh et al. | 370/332 |
| 8,134,977 B2 * | 3/2012 | Parekh et al. | 370/332 |
| 8,155,652 B2 * | 4/2012 | Parekh et al. | 455/436 |

(Continued)

FOREIGN PATENT DOCUMENTS

| | | |
|---|---|---|
| EP | 1708369 A1 | 10/2006 |
| JP | 2001145162 A | 5/2001 |
| JP | 2004356684 A | 12/2004 |

(Continued)

OTHER PUBLICATIONS

International Search Report—PCT/US08/069707, International Search Authority—European Patent Office—Aug. 12, 2008.
Written Opinion—PCT/US08/069707, International Search Authority—European Patent Office—Aug. 12, 2008.
Taiwan Search Report—TW097126202—TIPO—Sep. 14, 2011.

*Primary Examiner* — Tilahun B Gesesse
(74) *Attorney, Agent, or Firm* — Eric Ho

(57) ABSTRACT

The method and apparatus as described are directed toward techniques and mechanisms to improve access terminal battery life through search rate control. Controlling the rate at which access terminals search for alternate networks in a cell, and more particularly reducing unnecessary attempts, significantly increases the battery life of the access terminal.

30 Claims, 7 Drawing Sheets

U.S. PATENT DOCUMENTS

| | | |
|---|---|---|
| 8,224,319 B2 * | 7/2012 | Terabe .......................... 455/434 |
| 8,229,433 B2 * | 7/2012 | Parekh et al. ................. 455/436 |
| 2004/0184398 A1 * | 9/2004 | Walton et al. ................. 370/203 |
| 2006/0025137 A1 * | 2/2006 | Ormson ........................ 455/436 |
| 2006/0079232 A1 * | 4/2006 | Omori et al. .................. 455/436 |
| 2007/0032255 A1 * | 2/2007 | Koo et al. ..................... 455/512 |
| 2007/0060211 A1 | 3/2007 | Abdel-Kader |
| 2008/0233955 A1 * | 9/2008 | Narang et al. ................ 455/434 |

FOREIGN PATENT DOCUMENTS

| | | |
|---|---|---|
| KR | 20050118198 | 12/2005 |
| WO | WO9962285 A1 | 12/1999 |
| WO | 2007015795 A2 | 2/2007 |

* cited by examiner

EXTENDING ACCESS TERMINAL BATTERY LIFE THROUGH SEARCH RATE CONTROL

CROSS-REFERENCE TO RELATED APPLICATIONS

The present application for patent claims priority to Provisional Application No. 60/948,935 entitled "The method and apparatus for reducing the number of attempts made by UE to decode WCDMA NCELL" which was filled Jul. 10, 2007, and assigned to the assignee hereof and hereby expressly incorporated by reference herein.

BACKGROUND

1. Field

The present aspects relate to wireless communication devices, and more particularly, to apparatus and methods for improving access terminal battery life through search rate control.

2. Background

UMTS coverage (hereinafter referred to as "WCDMA coverage," "3G coverage," or simply as "3G") is not ubiquitous and for sometime will remain as islands of coverage with GSM/GPRS/Edge coverage (hereinafter referred to as "2G coverage" or simply as "2G") as the "fall back" technology that provides coverage to users leaving WCDMA coverage.

Once a user equipment (UE), which can also be referred to as a mobile, an access terminal, or other similar term), is camped on 2G cells, the UE reads the system information on the 2G cells to decide if the UE needs to start searching for WCDMA cells or not.

If the 2G cells contain the WCDMA NCELL list, then the UE is required to search for WCDMA cells every 30 seconds until all the primary synchronization codes (PSC) specified in the NCELL list are identified.

If UE is camped on a cell, which has the WCDMA NCELL list defined, but the WCDMA does not cover the entire area of the GSM cell, then the UE in such an area would be searching for WCMDA cells every 30 seconds and significantly reduce its battery life by so doing. Therefore, it would be desirable to have mechanisms and techniques that can lead to improvements in UE battery life for UEs on the edge of WCDMA coverage (3G coverage), while camped on in GSM/GPRS (2G).

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

The subject disclosure provides for improvements to access terminal battery life camped on the edge of network coverage via search rate control. In some aspects, disclosed is a method for communicating with a first network, searching for a second network at a search rate, and controlling the search rate based at least in part on at least one criteria.

In other aspects disclosed is an apparatus that facilitates improving battery life of access terminals. The apparatus can comprise a memory that retains instructions related to searching, at a search rate, at least one frequency, for a network in a cell transmitted on at least one frequency, and controlling the search rate based at least in part on at least one criteria, and a processor, coupled to the memory, configured to execute the instructions retained in the memory.

In one or more other aspects, disclosed is an apparatus that facilitates improving battery life of access terminals through search rate control. The apparatus includes means for searching for a network in a cell at a search rate, and means for controlling the search rate based at least in part on at least one criteria.

According to still other aspects, provided is a computer readable medium that includes computer executable instructions configured to facilitate improving battery life of access terminals through search rate control. The computer executable instructions a including code for communicating with a first network, code for searching for a second network at a search rate, and code for controlling the search rate based at least in part on at least one criteria.

In other aspects disclosed is an apparatus that facilitates improving battery life through search rate control. The apparatus includes a connection component that facilitates communication with at least one first network, the connection component including a criteria component that determines at least one criteria of the connection with the first network, and a search component that searches for at least one second network, the search component including a search rate component that defines the rate at which the search component searches for the second network, and the search component further including a control component that adjusts the search rate defined in the search rate component.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
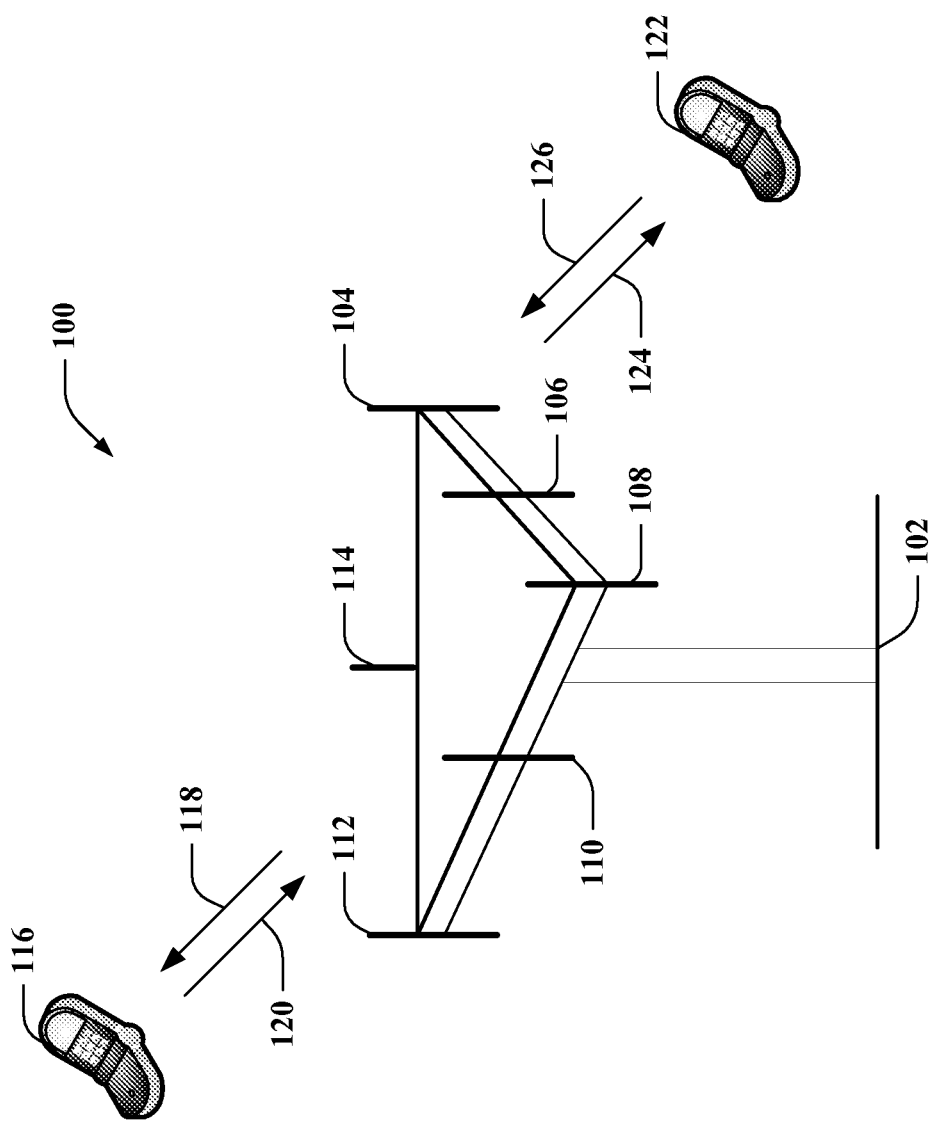
FIG. 1 illustrates an exemplary multiple access wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident; however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, eNodeB or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Additionally, while embodiments are generally described with respect to a communications system, those skilled in the art will recognize that the embodiments can be applied to any design employing finite-precision arithmetic, including both fixed-point and floating-point data representations. It is to be appreciated that the systems and/or methods described herein can be employed with any suitable type of design and all such types of design(s) are intended to fall within the scope of the hereto appended claims.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. This can be provided by using a precoder to steer signals in desired directions, for example. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology in one example.

According to an example, system 100 can be a multiple-input multiple-output (MIMO) communication system. Further, system 100 can utilize any type of duplexing technique (e.g., FDD and TDD, and the like) to divide communication channels (e.g., forward link channels or reverse link channels.

Moreover, the system 100 can be a multiple-bearer system. A bearer can be an information path of defined capacity, delay, bit error rate, etc. Mobile devices 116 and 122 can each serve one or more radio bearers. The mobile devices 116 and 122 can employ uplink rate control mechanisms to manage and/or share uplink resources across the one or more radio bearers. In one example, the mobile devices 116 and 122 can utilize token bucket mechanisms to serve the radio bearers and to enforce uplink rate limitations.

Pursuant to an illustration, each bearer can have an associated prioritized bit rate (PBR), maximum bit rate (MBR) and guaranteed bit rate (GBR). The mobile devices 116 and 122 can serve the radio bearers based, at least in part, on the associated bit rate values. The bit rate values can also be employed to calculate queue sizes that account for PBR and MBR for each bearer. The queue sizes can be included in uplink resource requests transmitted by the mobile devices 116 and 122 to the base station 102. The base station 102 can schedule uplink resources for mobile device 116 and 122 based upon respective uplink requests and included queue sizes.

Figure 2:
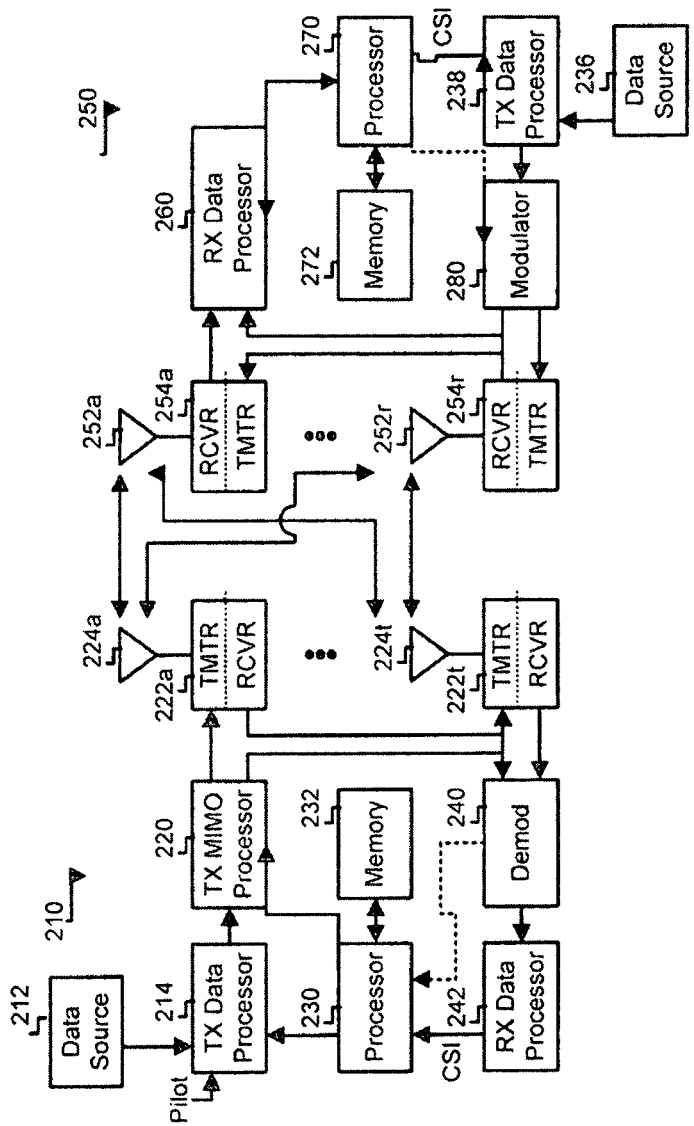
FIG. 2 illustrates a general block diagram of a communication system.

FIG. 2 is a block diagram of a transmitter system 210 (also known as the access point) and a receiver system 250 (also known as access terminal) in a MIMO system 200. At the transmitter system 210, traffic data for a number of data streams is provided from a data source 212 to a transmitter (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
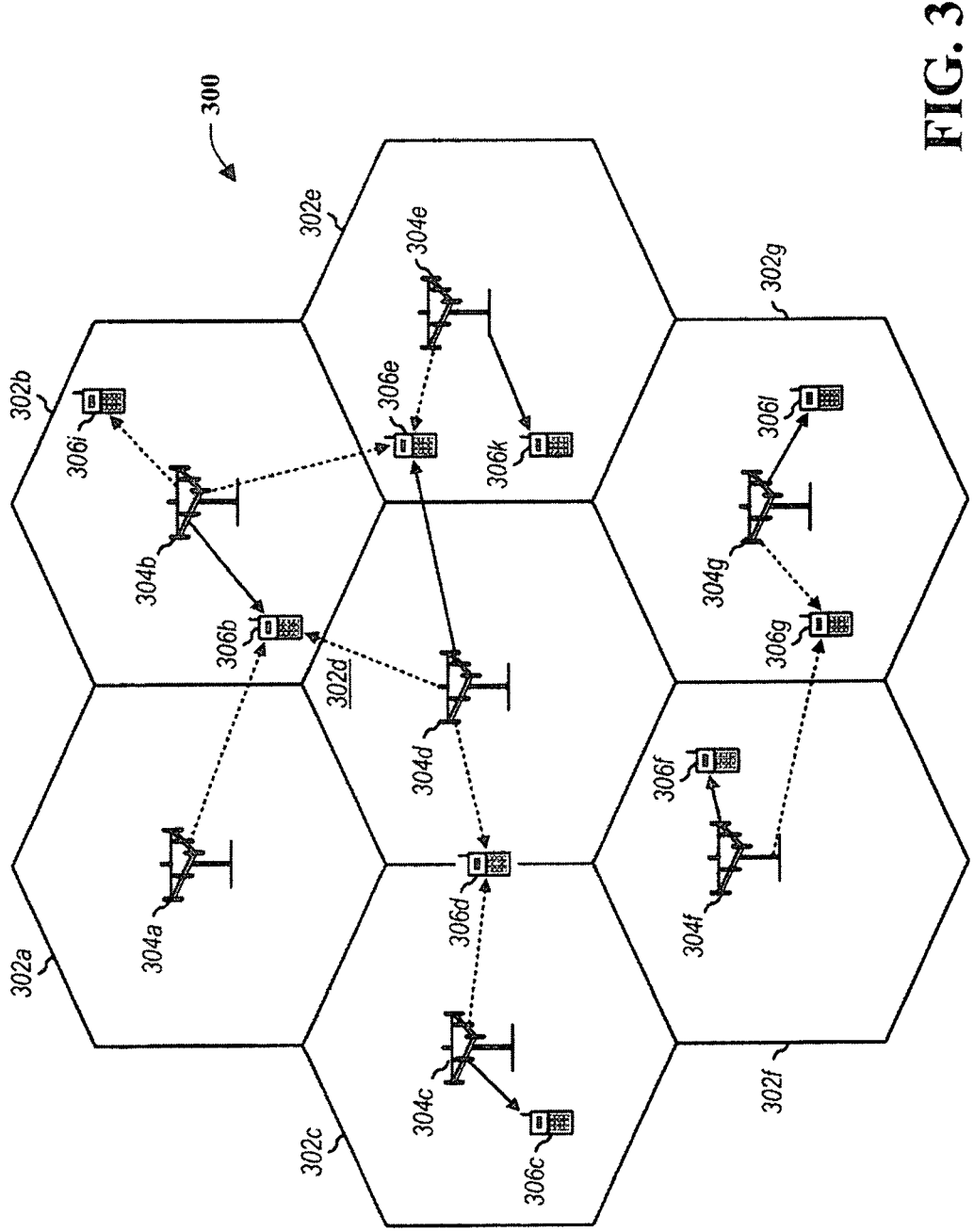
FIG. 3 illustrates an exemplary wireless communication system.

FIG. 3 illustrates an exemplary wireless communication system 300 configured to support a number of users, in which various disclosed embodiments and aspects may be implemented. As shown in FIG. 3, by way of example, system 300 provides communication for multiple cells 302, such as, for example, macro cells 302a-302g, with each cell being serviced by a corresponding access point (AP) 304 (such as APs 304a-304g). Each cell may be further divided into one or more sectors (e.g. to serve one or more frequencies). Various access terminals (ATs) 306, including ATs 306a-306k, also known interchangeably as user equipment (UE) or mobile stations, are dispersed throughout the system. Each AT 306 may communicate with one or more APs 304 on a forward link (FL) and/or a reverse link (RL) at a given moment, depending upon whether the AT is active and whether it is in soft handoff, for example. The wireless communication system 300 may provide service over a large geographic region, for example, macro cells 302a-302g may cover a few blocks in a neighborhood.

The cells 302 can provide coverage via a plurality of networks, such as GSM/GPRS/Edge network (hereinafter referred to as "2G network"), and/or UMTS network (hereinafter referred to as "WCDMA coverage," "3G network," or simply as "3G"). The system 300 can have a first network in the cells, wherein the first network is the most readily available network, or can be considered the "fall back" technology having the greatest coverage area. In addition, the system 300 may have a second network that is available in a subset of the cells 302, and is not as readily available as the first network. For example, the second network may not be available in each cell 302, and/or may not cover the entire area of the cells 302 in which it is available. Users leaving the second network are provided coverage by the first network. For instance, the system 300 can include 2G and 3G networks, wherein the 2G network covers the entire system 300, and the 3G network is available in some locations throughout the system 300.

During an intersystem handover scenario, the ATs 306 handover from the first network to the second network, or vice versa. An intersystem handover scenario begins when the ATs 306 are connected to the first network; they read the system information on the cell 302 in which the AT 306 is currently located, and determine if the ATs 306 should start searching for the second network. If the cell 302 contains a neighboring cells list (hereinafter referred to as "NCELL list") for the second network (e.g. WCDMA NCELL list), then the ATs 306 search for the second network at a predetermined rate (e.g. every 30 seconds) until the second network is successfully identified. For instance, if the ATs 306 are connected to a first 2G network, and the second network is a 3G network, then the ATs 306 will search for the 3G network every 30 seconds until all the primary synchronization codes (PSC) specified in the WCDMA NCELL list are identified. Consequently, the AT 306c will consume superfluous battery power if it is outside of the second network's coverage area, because continuously searching reduces the sleep cycle for the AT 306c.

In accordance, with an aspect of the present invention the ATs 306 can control the rate at which they search for the second network (hereinafter referred to as "search rate") during an intersystem handover scenario. For instance, the ATs 306 can control the search rate by introducing one or more back-off schemes. The back-off schemes can include but are not limited to exponential back-off schemes, non-exponential back-off schemes, linear back-off schemes, non-linear back-off schemes, and so forth. Control of the search rate can be introduced based on any of a plurality of criteria, such as successive search failures, movement of the ATs 306, and/or signal strength (discussed infra). For instance, the AT 306d can begin an intersystem handover scenario, wherein the AT 306d is searching for the second network at the rate of once every X seconds. If a predetermined number of successive searches for the second network fail, and the AT 306d is not moving, then the AT 306d can introduce an exponential back-off scheme. The exponential back-off scheme can adjust the search rate such that the AT 306d searches for the second network every $X^Y$ seconds for the next Z attempts, where Y is a predetermined exponential back-off factor, and Z is a predetermined search interval. In other words, the AT 306d will search at an exponentially slower increment for the next set of attempts.

Figure 4:
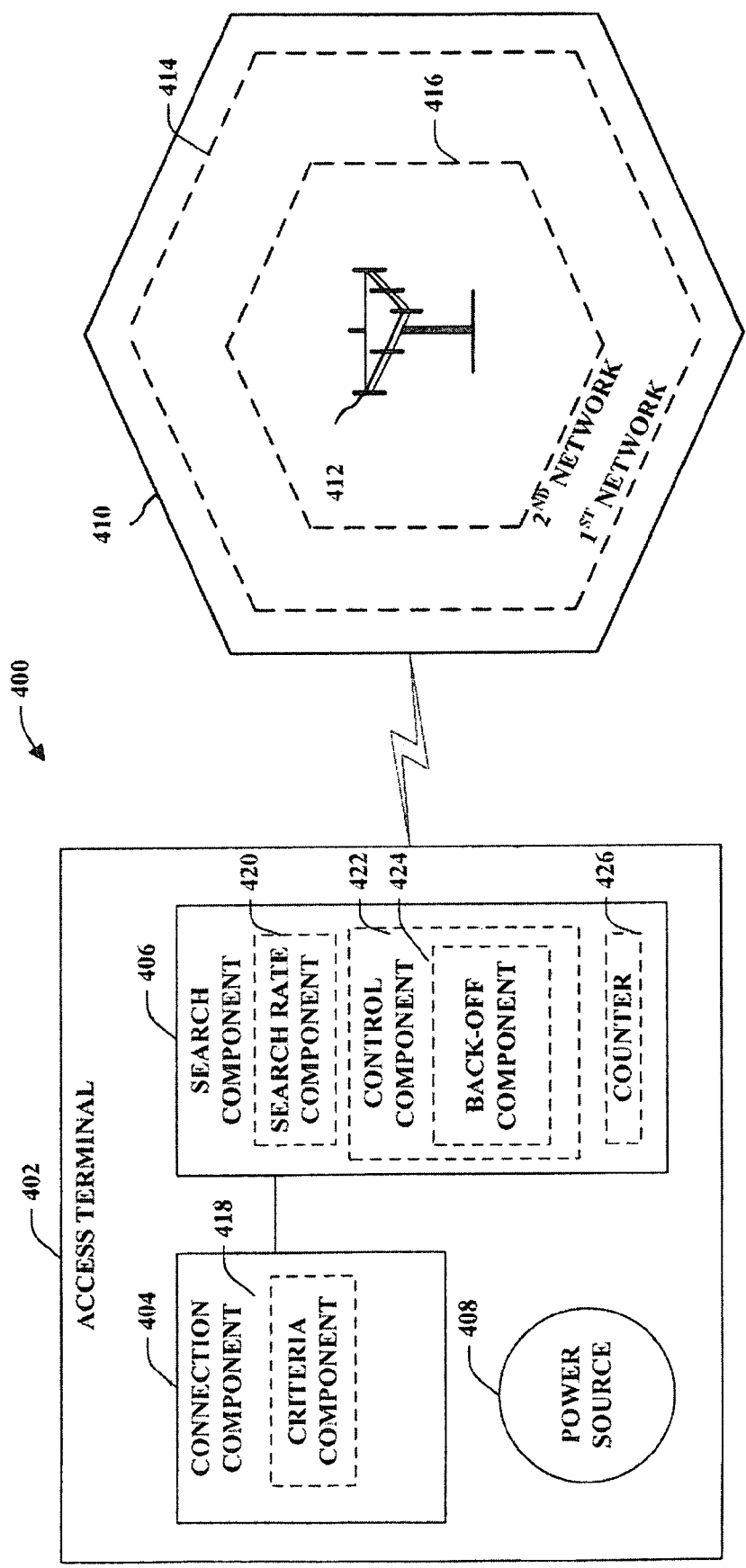
FIG. 4 is a general component block diagram illustrating an exemplary wireless communication apparatus for implementing search rate control.

Referring now to FIG. 4, an exemplary apparatus for implementing search rate control on an access terminal is shown. The diagram 400 includes an access terminal 402, having a connection component 404, a search component 406, and a power source 408. As previously discussed, the access terminal 402 provides for communication via a wireless communication framework 410 (e.g. multiple access wireless communication system). The wireless communication framework 410 includes a wireless access point 412 having a first network 414, and a second network 416. The access terminal 402 can communicate with the communication framework 410 by connecting to the networks 414 or 416 carried on the access point 410. For simplicity of explanation, the communication framework 410 is shown as having a single access point 410, and the access point 410 is illustrated as having only two networks 414 and 416. However it is to be appreciated that the communication framework 410 can include a plurality of access points, and the access point 410 can include a plurality of networks.

The connection component 404 facilitates communication with the communication framework 410. The connection component 404 includes a criteria component 418 that determines one or more criteria related to a connection and/or mobility of the access terminal 402 in relation to the communication framework. For instance, the criteria component 418 can determine movement of the access terminal 402, the signal strength of a network to which the access terminal 402 is presently connected, and so forth. Depending on the implementation, movement of the access terminal 402 can be determined by tracking the variance of the signal strength. Significant variance is variance above a predetermined threshold, and typically this threshold can be determined by a system designer, administrator, and so forth. Additionally or alternatively, the criteria component 418 can determine the access terminal is moving based on a plurality of criteria, including but not limited to the number of reselections made by the access terminal 402 over a predetermined time period, the number of new neighbors detected by the access terminal 402 over a predetermined time period, the variations in the receiver automatic gain control (Rx AGC) above a predetermined threshold of a serving cell, and/or the variations in the Rx AGC of neighbor cells above a predetermined threshold. For example, a system designer may determine that if the access terminal 402 effectuates 2 or more reselections, or detects more than 2 new neighbors over a period of time X, then the access terminal is moving. Similarly, a system designer can determine that variations in the Rx AGC, or Rx AGC of neighbor cells above a threshold Z indicate the access terminal is moving.

When the access terminal 402 is camped on the first network 414 in a cell (e.g. 2G network), the search component 406 reads the system information to determine if the access terminal 402 needs to start searching for a second network (e.g. 3G network). An intersystem handover scenario is initiated when the search component 406 determines the access terminal 402 should begin searching for the second network 416. The search component 406 includes a search rate component 420 that determines the rate at which the search component 406 searches for the second network 416. For instance, if the cell contains a NCELL list for the second network (e.g. WCDMA NCELL list), then the search component 404 searches for the second network 416 at the rate defined in the search rate component 420 (e.g. X, or every 30 seconds). In addition, the search component 406 includes a control component 422 that can adjust the rate defined in the search rate component 420 based at least in part on one or more criteria determined by the criteria component 418. As previously discussed, each cell can be divided into one or more sectors, and can transmit the networks on one or more frequencies. Consequently, it is to be appreciated that a NCELL list can contain a plurality of frequencies, and the access terminal 402 can implement search rate control for each frequency contained therein.

The criteria for determining the introduction of search rate control is largely based on a system administrator's preference, as well as the unique capabilities of the system in which the search rate control is to be implemented. For instance, in some systems certain criteria, such as signal strength, may be more reliable or valuable than other criteria. In addition, system administrators may desire achievement of various results, which require the use of different criteria. As with many wireless system modifications, implementation of search rate control for the access terminal 402 may require balancing various objectives. For instance, in a system containing a first and a second network, a back-off scheme can be implemented during an intersystem handover scenario to preserve the power source 408, which is balanced with the desire to operate the access terminal 404 on the most desirable network (e.g. most efficient, fastest, best coverage, etc.) as frequently as possible.

The control component 422 includes a back-off component 424 that provides one or more back-off schemes for use by the control component 422 in adjusting the rate defined in the search rate component 420. The back-off component 424 can implement the back-off schemes based on one or more criteria determined by the criteria component 416, and/or the successive number of failed searches maintained in a counter component 426. For instance, the back-off component 424 can implement a back-off scheme when the counter component 426 exceeds a predetermined number of failed successive searches (e.g. 5), and the criteria component 418 determines the access terminal 402 is not moving. The criteria used in the foregoing example may be selected, because they indicate that the access terminal 402 is on the edge of the second network 416. Moreover, the power consumed by the access terminal 402 from the power source 408 is proportional to the number and/or frequency of searches executed by the search component 406. Consequently, decreasing the total number of searches and/or frequency of searches executed by the search component 406 decreases the power consumed from the power source 408.

Figure 5:
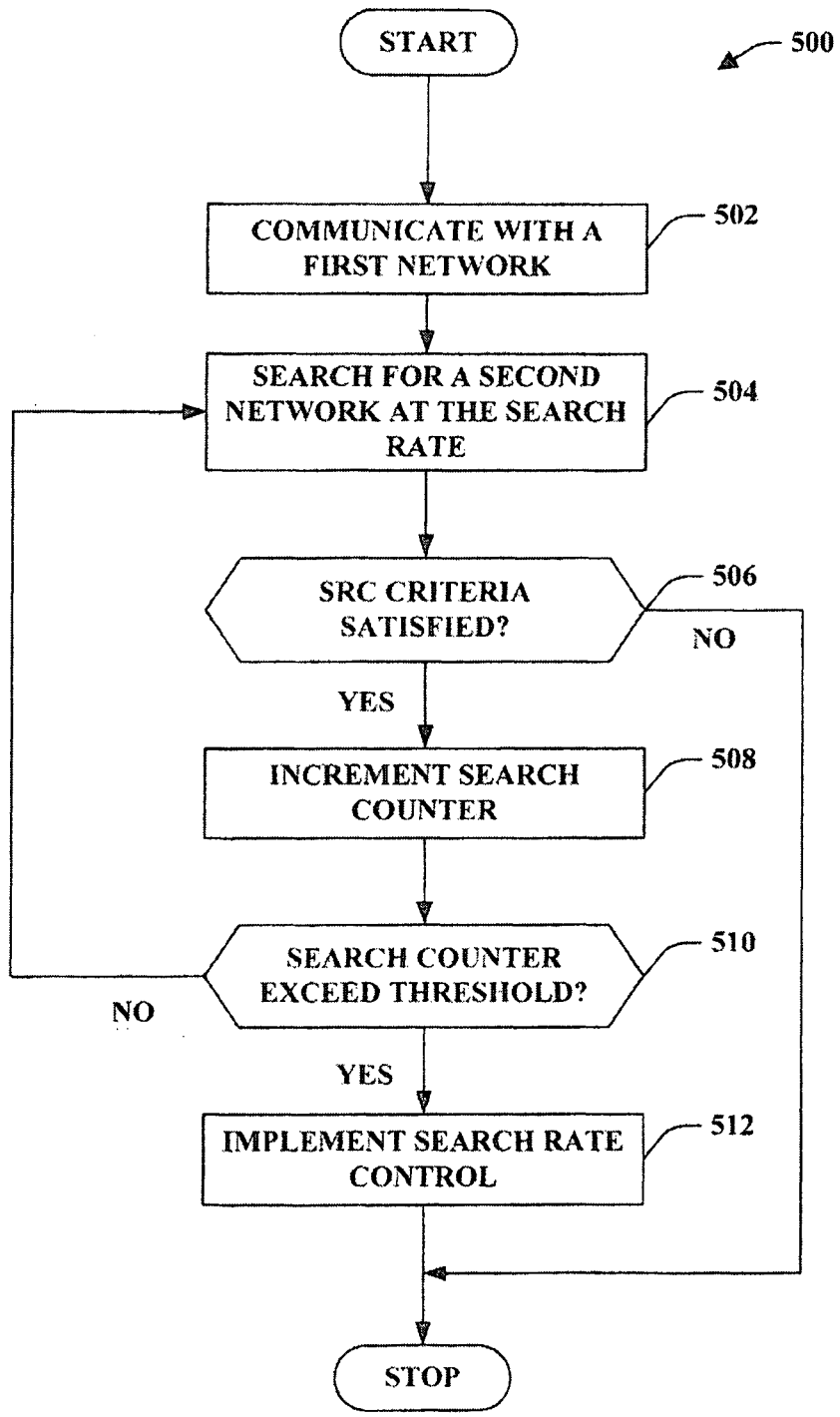
FIG. 5 is a flow chart illustrating a generalized methodology of implementing search rate control.

In view of the exemplary systems described supra, methodologies that may be implemented in accordance with the disclosed subject matter will be better appreciated with reference to the flow chart of FIG. 5. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 5 illustrates a generalized methodology 500 that facilitates increasing access terminal battery life through search rate control. At 502, an access terminal is communicating with a first network in a cell. At 504, assuming that the access terminal has already begun an intersystem handover scenario (as previously discussed); the access terminal searches for a second network (e.g. 3G) every X seconds, where X is a the search rate.

At 506, the access terminal determines if one or more criteria for search rate control (SRC) are satisfied. For example, access terminal mobility can be one of the criteria, and if the access terminal is not moving (e.g. mobility) then the criteria for search rate control are satisfied. As discussed previously, the access terminal can determine its mobility based on a plurality of criteria including but not limited to whether the signal strength is varying significantly, the number of reselections over a predetermined period of time, the number of new neighbors detected over a predetermined period of time, variation in Rx AGC above a certain threshold, variation in Rx AGC of neighbor cells above a certain threshold, and so forth.

At 508, if the criteria are satisfied (e.g. access terminal was not moving during the previous search interval) (YES at 504), then a search counter is incremented (e.g. by one). At 510, the search counter is compared to a predetermined threshold value. If the search counter does not exceed the predetermined threshold value (NO at 510), then the access point will search again in X seconds. If the search counter Y exceeds the predetermined threshold value (YES at 510), then the access terminal performs or implements search rate control at 512. Search rate control can include adjusting the search rate by employing a back-off scheme. In one example, the time between searches may be lengthened. In this case, the rate, as defined by the number of searches performed during a predefined time period, decreases. Since each search consumes battery life of the access terminal, as the number of searches decreases, battery life is conserved. For instance, the access terminal can implement a linear back-off scheme, wherein the access terminal will search for the second network every X*Y for the next Z attempts. Additionally or alternatively, an NCELL list can contain a plurality of frequencies, and the access terminal can implement search rate control (e.g. a back-off scheme) for each frequency contained therein.

Additionally or alternatively, it is to be appreciated that the method of search rate control illustrated in FIG. 5 can be applied to virtually any intersystem handover scenario, and is not limited to the exemplary wireless communications systems discussed herein. For instance, the aforementioned method of search rate control can be applied to access terminals operating in a wireless local area network (WLAN), wherein the WLAN has two or more networks available.

Figure 6:
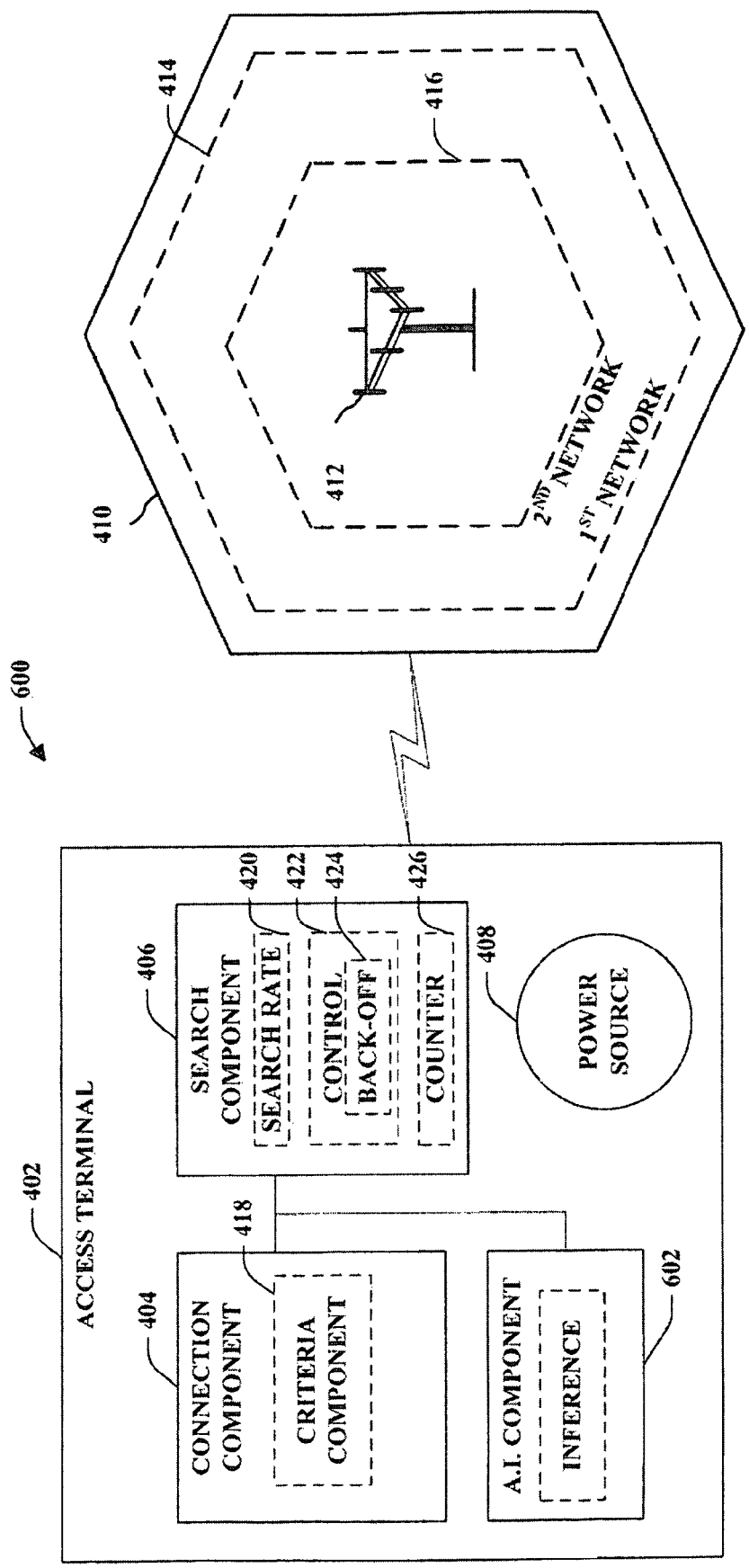
FIG. 6 illustrates an approach that employs an artificial intelligence component which facilitates automating one or more features in accordance with an alternative embodiment.

FIG. 6 illustrates an approach 600 that employs an artificial intelligence (AI) component 602 which facilitates automating one or more features in accordance with the subject methods and apparatuses. The search control rate methods and apparatuses (e.g., in connection with inferring) can employ various AI-based schemes for carrying out various aspects thereof. For example, a process for determining criteria that can be used to trigger implementation of a back-off scheme can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. For instance, depending on the implementation a confidence can be assigned to the set of criteria, and an inference can be made as to the criteria that should be used as triggers for implementing search rate control.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., primary versus secondary, static versus dynamic, . . . ), and at what time of day to implement tighter criteria controls (e.g., in the evening when system performance would be less impacted).

Figure 7:
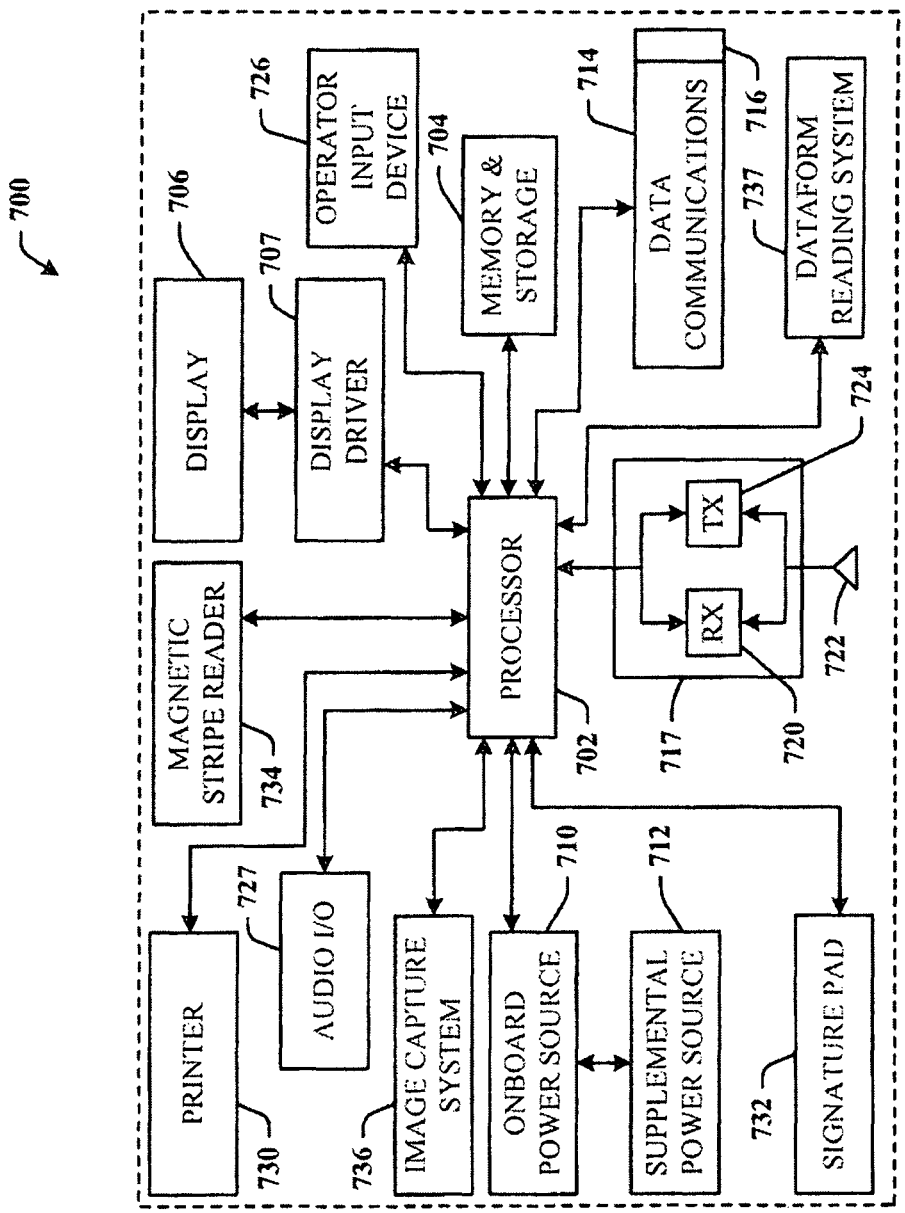
FIG. 7 illustrates an exemplary device operative to execute the one or more embodiments disclosed herein.

Referring now to FIG. 7, illustrated is a schematic block diagram of a portable hand-held terminal device 700, in which a processor 702 is responsible for controlling the general operation of the device 700. The processor 702 is programmed to control and operate the various components within the device 700 in order to carry out the various functions described herein. The processor 702 can be any of a plurality of suitable processors. The manner in which the processor 702 can be programmed to carry out the functions relating to the invention will be readily apparent to those having ordinary skill in the art based on the description provided herein.

A memory 704 connected to the processor 702 serves to store program code executed by the processor 702, and serves as a storage means for storing information such as user credential and receipt transaction information and the like. The memory 704 can be a nonvolatile memory suitably adapted to store at least a complete set of the information that is displayed. Thus, the memory 704 can include a RAM or flash memory for high-speed access by the processor 702 and/or a mass storage memory, e.g., a micro drive capable of storing gigabytes of data that comprises text, images, audio, and video content. According to one aspect, the memory 704 has sufficient storage capacity to store multiple sets of information, and the processor 702 could include a program for alternating or cycling between various sets of display information.

A display 706 is coupled to the processor 702 via a display driver system 708. The display 706 can be a color liquid crystal display (LCD), plasma display, or the like. In this example, the display 706 is a ¼ VGA display with sixteen levels of gray scale. The display 706 functions to present data, graphics, or other information content. For example, the display 706 can display a set of customer information, which is displayed to the operator and can be transmitted over a system backbone (not shown). Additionally, the display 706 can display a variety of functions that control the execution of the device 700. The display 706 is capable of displaying both alphanumeric and graphical characters.

Power is provided to the processor 702 and other components forming the hand-held device 700 by an onboard power system 710 (e.g. a battery pack). In the event that the power system 710 fails or becomes disconnected from the device 700, a supplemental power source 712 can be employed to provide power to the processor 702 and to charge the onboard power system 710. The processor 702 of the device 700 induces a sleep mode to reduce the current draw upon detection of an anticipated power failure.

The terminal 700 includes a communication subsystem 714 that includes a data communication port 716, which is employed to interface the processor 702 with a remote computer. The port 716 can include at least one of Universal Serial Bus (USB) and IEEE 1394 serial communications capabilities. Other technologies can also be included, for example, infrared communication utilizing an infrared data port.

The device 700 can also include a radio frequency (RF) transceiver section 718 in operative communication with the processor 702. The RF section 718 includes an RF receiver 720, which receives RF signals from a remote device via an antenna 722 and demodulates the signal to obtain digital information modulated therein. The RF section 718 also includes an RF transmitter 724 for transmitting information to a remote device, for example, in response to manual user input via a user input device 726 (e.g., a keypad) or automatically in response to the completion of a transaction or other predetermined and programmed criteria. The transceiver section 718 facilitates communication with a transponder system, for example, either passive or active, that is in use with product or item RF tags. The processor 702 signals (or pulses) the remote transponder system via the transceiver 718, and detects the return signal in order to read the contents of the tag memory. In one implementation, the RF section 718 further facilitates telephone communications using the device 700. In furtherance thereof, an audio I/O section 728 is provided as controlled by the processor 702 to process voice input from a microphone (or similar audio input device) and audio output signals (from a speaker or similar audio output device).

In another implementation, the device 700 can provide voice recognition capabilities such that when the device 700 is used simply as a voice recorder, the processor 702 can facilitate high-speed conversion of the voice signals into text content for local editing and review, and/or later download to a remote system, such as a computer word processor. Similarly, the converted voice signals can be used to control the device 700 instead of using manual entry via the keypad 726.

Onboard peripheral devices, such as a printer 730, signature pad 732, and a magnetic strip reader 734 can also be provided within the housing of the device 700 or accommodated externally through one or more of the external port interfaces 716.

The device 700 can also include an image capture system 736 such that the user can record images and/or short movies for storage by the device 700 and presentation by the display 706. Additionally, a dataform reading system 738 is included for scanning dataforms. It is to be appreciated that these imaging systems (736 and 738) can be a single system capable of performing both functions.

What is claimed is:

1. A method, comprising:
communicating with a first network using a communication device;
determining information related to a second network from the first network;
searching for the second network at a search rate, wherein the search rate corresponds to a time interval between two or more successive searches for the second network;
determining whether information detected at the communication device indicates movement of the communication device;
when the information detected at the communication device indicates movement of the communication device, performing a second search for the second network at the search rate; and
when the information detected at the communication device does not indicate movement of the communication device, implementing a back-off scheme at the communication device to determine an adjusted search rate.

2. The method of claim 1, wherein the first network is a 2G network, and the second network is a 3G network.

3. The method of claim 1, wherein the back-off scheme comprises at least one of an exponential back-off scheme or a linear back-off scheme.

4. The method of claim 1, wherein the information detected at the communication device comprises at least one of: variance of a signal strength beyond a threshold signal strength, a number of reselections over a time period, a number of new neighbors detected over a time period, a variation in a receiver automatic gain control (Rx AGC) above a threshold Rx AGC, or a variation in Rx AGC of neighbor cells above the threshold Rx AGC.

5. The method of claim 1, wherein the second network utilizes a plurality of frequencies, further comprising searching each of the frequencies for the second network and determining the adjusted search rate for each frequency.

6. The method of claim 1, further comprising automating, via artificial intelligence, at least one of: searching for the second network, determining the adjusted search rate, or determining whether the information detected at the communication device indicates movement of the communication device.

7. The method of claim 1, wherein the information related to the second network comprises a cell list for the second network.

8. The method of claim 1, wherein the adjusted search rate is applied to a plurality of searches before a second adjusted search rate is determined.

9. The method of claim 1, wherein at least one of the two or more successive searches fails to detect the second network.

10. The method of claim 9, wherein the back-off scheme determines the adjusted search rate based on a number of successive failed searches.

11. A wireless communication apparatus, comprising:
a memory that retains instructions related to:
searching, at a search rate, for a network based on determined information related to the network, wherein the search rate corresponds to a time interval between two or more successive searches for the network;
determining whether detected information indicates movement of the wireless communication apparatus;
when the detected information indicates movement of the wireless communication apparatus, performing a second search for the network at the search rate; and
when the detected information does not indicate movement of the wireless communication apparatus, implementing a back-off scheme to adjust the search rate; and
a processor coupled to the memory, configured to execute the instructions retained in the memory.

12. An apparatus, comprising:
means for communicating with a first network;
means for determining information related to a second network from the first network;
means for searching for the second network at a search rate, wherein the search rate corresponds to a time interval between two or more successive searches for the second network;
means for implementing a back-off scheme to adjust the search rate; and
means for determining whether information detected indicates movement of the apparatus,
wherein when the information detected indicates movement of the apparatus, a second search for the second network at the search rate is performed, and when the information detected does not indicate movement of the apparatus, the means for implementing a back-off scheme adjusts the search rate based on the back-off scheme.

13. The apparatus of claim 12, wherein the back-off scheme comprises at least one of a non-exponential back-off scheme or a non-linear back-off scheme.

14. The apparatus of claim 12, wherein the information detected comprises at least one of: variance of a signal strength beyond a threshold signal strength, a number of reselections over a time period, a number of new neighbors detected over a time period, a variation in a receiver automatic gain control (Rx AGC) above a threshold Rx AGC, or a variation in Rx AGC of neighbor cells above the threshold Rx AGC.

15. The apparatus of claim 12, wherein the second network utilizes a plurality of frequencies, and further comprising means for adjusting the search rate for each frequency over which the second network is transmitted.

16. The apparatus of claim 12, further comprising means for automating at least one of: searching for the network, adjusting the search rate, or determining whether the information detected indicates movement of the apparatus.

17. A computer-readable device storing instructions which, when executed by a processor, cause the processor to:
communicate with a first network using a communication device;
determine information related to a second network from the first network;
search for the second network at a search rate, wherein the search rate corresponds to a time interval between two or more successive searches for the second network;
determine whether information detected at the communication device indicates movement of the communication device;
when the information detected at the communication device indicates movement of the communication device, perform a second search for the second network at the search rate; and
when the information detected at the communication device does not indicate movement of the communication device, implement a back-off scheme to adjust the search rate.

18. The computer-readable device of claim 17, wherein the first network is a 2G network, and the second network is a 3G network.

19. The computer-readable device of claim 17, wherein the back-off scheme includes at least one of an exponential back-off scheme or a linear back-off scheme.

20. The computer-readable device of claim 17, wherein the information detected at the communication device comprises at least one of: variance of a signal strength beyond a threshold signal strength, a number of reselections over a time period, a number of new neighbors detected over a time period, a variation in a receiver automatic gain control (Rx AGC) above a threshold Rx AGC, or a variation in Rx AGC of neighbor cells above a the threshold Rx AGC.

21. The computer-readable device of claim 17, wherein the second network utilizes a plurality of frequencies, further comprising instructions, which, when executed by the processor, cause the processor to search each of the frequencies of the second network and to adjust the search rate for each frequency.

22. The computer-readable device of claim 17, further comprising instructions stored thereon, which, when executed by the processor, cause the processor to automate, via artificial intelligence, at least one of: searching for the second network, adjusting the search rate, or determining whether the information detected at the communication device indicates movement of the communication device.

23. The computer-readable device of claim 17, wherein the information related to the second network comprises a cell list for the second network.

24. A wireless communications apparatus, comprising:
a processor configured to:
communicate with a first network;
determine information related to a second network from the first network;
search for the second network at a search rate, wherein the search rate corresponds to a time interval between two or more successive searches for the second network;
determine whether information detected at the wireless communications apparatus indicates movement of the wireless communications apparatus;
when the information detected at the wireless communications apparatus indicates movement of the wireless communications apparatus, perform a second search for the second network at the search rate; and when the information detected at the wireless communications apparatus does not indicate movement of the wireless communications apparatus, implement a back-off scheme at the wireless communications apparatus to adjust the search rate.

25. The apparatus of claim 24, wherein the information related to the second network comprises a cell list for the second network.

26. A wireless communication apparatus, comprising:
a connection component to facilitate communication with a first network;
a determination component to determine information related to a second network from the first network;
a search component to search for a second network at a search rate, wherein the search rate corresponds to a time interval between two or more successive searches for the second network;
a criteria component to determine whether information detected indicates movement of the wireless communication apparatus; and
a back-off component to implement a back-off scheme to adjust the search rate;

wherein, when the information detected indicates movement of the wireless communication apparatus, the search component performs a second search for the second network at the search rate, and when the information detected does not indicate movement of the wireless communication apparatus, the back-off component implements the back-off scheme to adjust the search rate.

27. The apparatus of claim 26, wherein the first network is a 2G network, and the second network is a 3G network.

28. The apparatus of claim 26, wherein the back-off scheme comprises at least one of a linear back-off scheme or an exponential back-off scheme.

29. The apparatus of claim 26, wherein the information detected comprises at least one of: variance of a signal strength beyond a threshold signal strength, a number of reselections over a time period, a number of new neighbors detected over a time period, a variation in a receiver automatic gain control (Rx AGC) above the threshold Rx AGC, or a variation in Rx AGC of neighbor cells above the threshold Rx AGC.

30. The apparatus of claim 26, wherein the information related to the second network comprises a cell list for the second network.

* * * * *